(12) United States Patent
Ebergen

(10) Patent No.: US 6,892,278 B2
(45) Date of Patent: May 10, 2005

(54) METHOD AND APPARATUS FOR EFFICIENTLY IMPLEMENTING A LAST-IN FIRST-OUT BUFFER

(75) Inventor: Josephus C. Ebergen, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 232 days.

(21) Appl. No.: 10/091,994

(22) Filed: Mar. 5, 2002

(65) Prior Publication Data

US 2003/0172231 A1 Sep. 11, 2003

(51) Int. Cl.[7] .......................... G06F 12/00; G06F 12/08
(52) U.S. Cl. ..................... 711/118; 711/165; 711/132
(58) Field of Search ............... 711/118, 165, 711/132; 710/52, 54, 53, 56

(56) References Cited

U.S. PATENT DOCUMENTS

| | | | | |
|---|---|---|---|---|
| 4,751,675 A | * | 6/1988 | Knauer | 365/78 |
| 5,269,012 A | * | 12/1993 | Nakajima | 711/200 |
| 2003/0120879 A1 | * | 6/2003 | Chen et al. | 711/154 |

* cited by examiner

Primary Examiner—Mano Padmanabhan
Assistant Examiner—Midys Inoa
(74) Attorney, Agent, or Firm—Park, Vaughan + Fleming, LLP

(57) ABSTRACT

One embodiment of the present invention provides a system that implements a last-in first-out buffer. The system includes a plurality of cells arranged in a linear array to form the last-in first-out buffer, wherein a given cell in the interior of the linear array is configured to receive get and put calls from a preceding cell in the linear array, and to make get and put calls to a subsequent cell in the linear array. If the given cell contains no data items, the given cell is configured to make a get call to retrieve a data item from the subsequent cell. In this way the data item becomes available in the given cell to immediately satisfy a subsequent get call to the given cell without having to wait for the data item to propagate to the given cell from subsequent cells in the linear array. If the given cell contains no space for additional data items, the given cell is configured to make a put call to transfer a data item to the subsequent cell. In this way, space becomes available in the given cell to immediately satisfy a subsequent put call to the given cell without having to wait for data in the given cell to propagate to subsequent cells in the linear array.

19 Claims, 18 Drawing Sheets

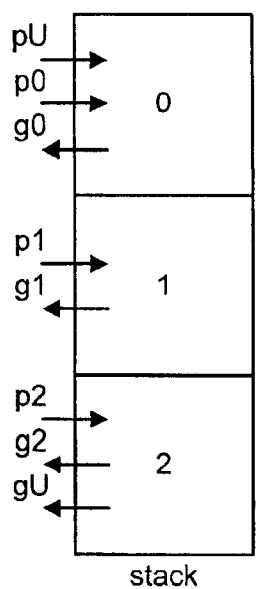
FIG. 1A
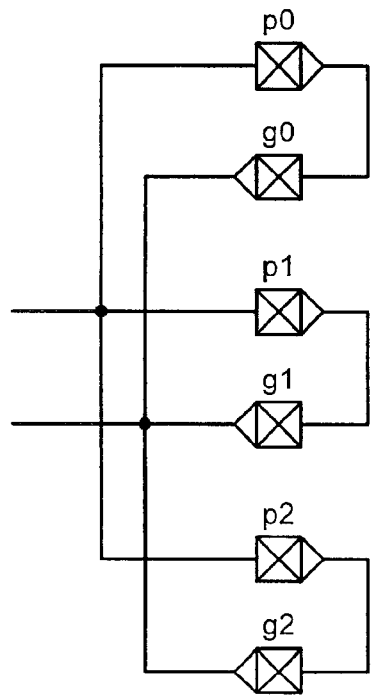
FIG. 1B
```
state E where
    E  = ( p0 -> S1
         | gU -> E  )
    S1 = ( p1 -> S2
         | g0 -> E  )
    S2 = ( p2 -> F
         | g1 -> S1 )
    F  = ( pU -> F
         | g2 -> S2 )
end
```
FIG. 1C
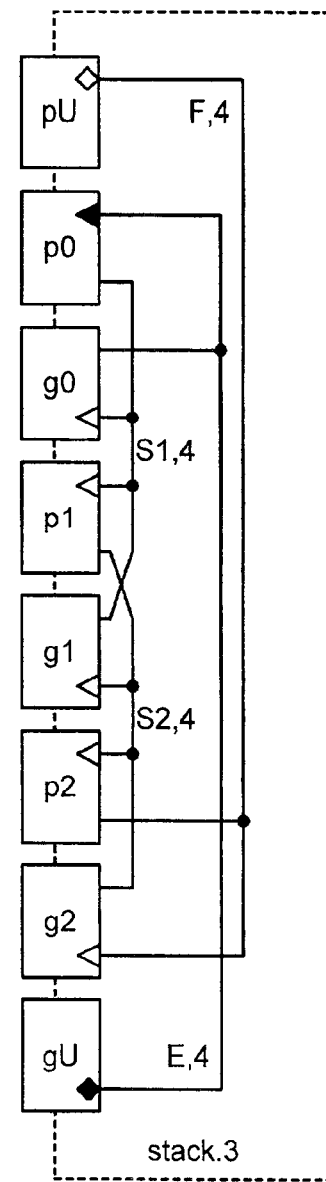
FIG. 1D

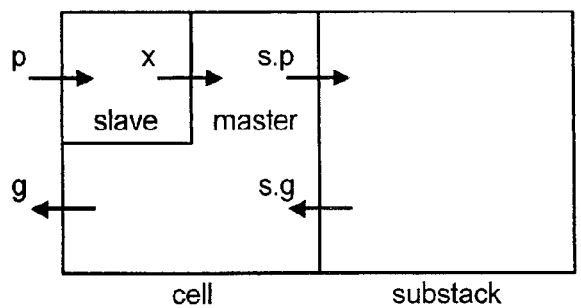
FIG. 3A
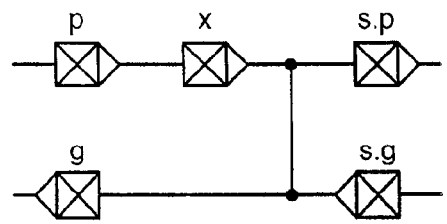
FIG. 3B
```
cell = ( p -> s.p -> x -> cell
       | g -> s.g -> cell )
```
FIG. 3C
```
cell =
state N where
   N = ( p -> P
       | g -> G )
   P = ( s.p -> X )
   G = ( s.g -> N )
   X = ( x -> N )
end
```
FIG. 3D
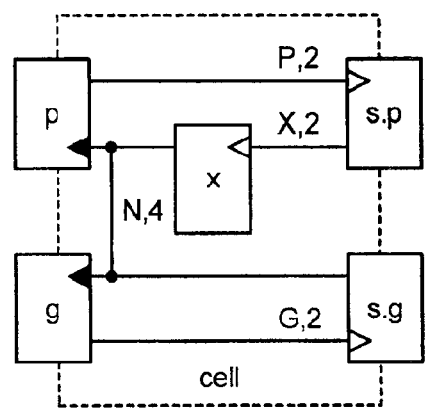
FIG. 3E

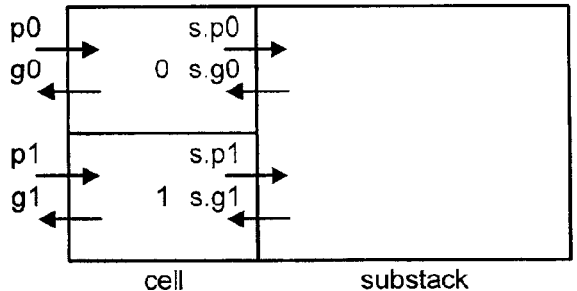
FIG. 5A
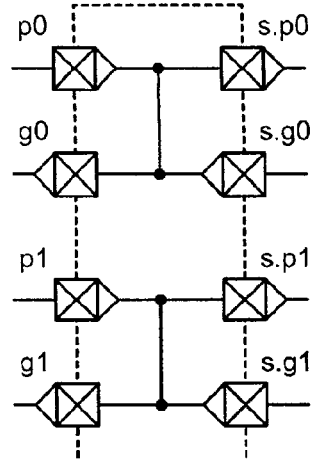
FIG. 5B
```
cell =
state N0 where
    N0 = ( p0 -> s.p1 -> N1
         | g1 -> s.g0 -> N1 )
    N1 = ( p1 -> s.p0 -> N0
         | g0 -> s.g1 -> N0 )
end
```
FIG. 5C
```
cell =
state N0 where
    N0 = ( p0 -> P1
         | g1 -> G0 )
    N1 = ( p1 -> P0
         | g0 -> G1 )
    P0 = ( s.p0 -> N0 )
    P1 = ( s.p1 -> N1 )
    G0 = ( s.g0 -> N1 )
    G1 = ( s.g1 -> N0 )
end
```
FIG. 5D
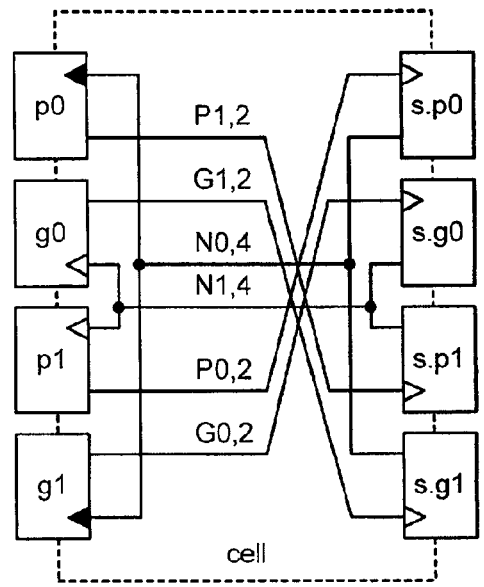
FIG. 5E

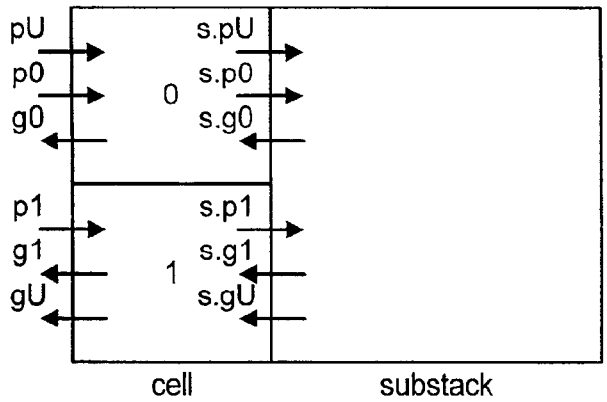
FIG. 7A
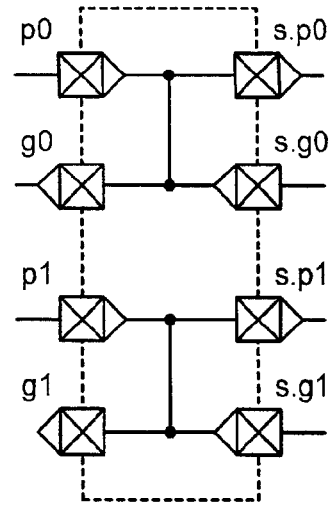
FIG. 7B
```
state E where
   E  = ( p0  ->  N1
        | gU  ->  E )
   N1 = ( p1  ->  (s.p0 -> N0
                  |s.pU -> F )
        | g0  ->  (s.g1 -> N0
                  |s.gU -> E ))
   N0 = ( p0  ->  s.p1 -> N1
        | g1  ->  s.g0 -> N1 )
   F  = ( pU  ->  F
        | g1  ->  N1 )
end
```
FIG. 7C

```
cell =
state E where
    E  = ( p0a  -> N1
         | gU   -> E  )
    N1 = ( p1   -> P0
         | g0   -> G1 )
    N0 = ( p0b  -> P1
         | g1b  -> G0 )
    F  = ( pU   -> F
         | g1a  -> N1 )
    P0 = ( s.p0a -> N0
         | s.p0b -> N0
         | s.pU  -> F  )
    G0 = ( s.g0  -> N1 )
    P1 = ( s.p1  -> N1 )
    G1 = ( s.g1a -> N0
         | s.g1b -> N0
         | s.gU  -> E  )
end
```

```
stack(2) =
state E where
   E = ( p0a  -> N
       | gU   -> E )
   N = ( p1   -> F
       | g0   -> E )
   F = ( pU   -> F
       | g1a  -> N )
   U = ( p0b  | g1b )
end
```

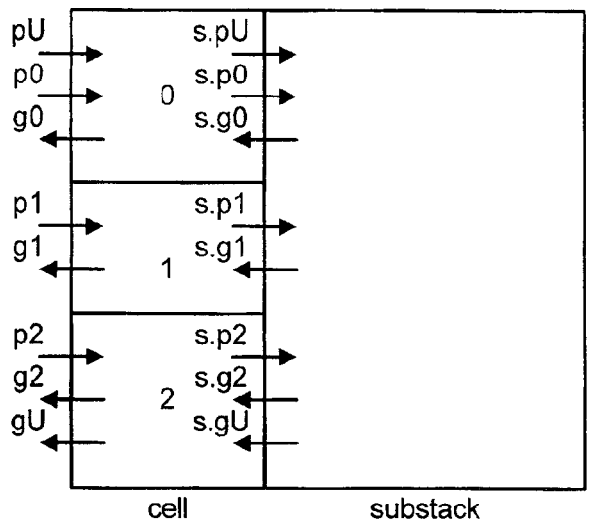
FIG. 11A
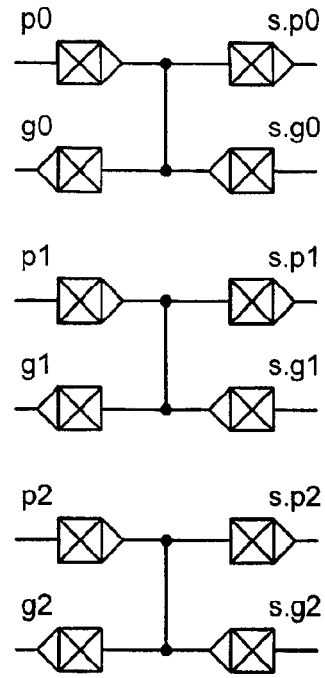
FIG. 11B
```
state E where
    E  = ( pU -> N1
         | gU -> E )
    N0 = ( p0 -> if full(1) then P1
                 else N1 fi
         | g2 -> if full(1) then N2
                 else G1 fi )
    N1 = ( p1 -> if full(2) then P2
                 else N2 fi
         | g0 -> if full(2) then N0
                 else G2 fi )
    N2 = ( p2 -> if full(0) then P0
                 else N0 fi
         | g1 -> if full(0) then N1
                 else G0 fi )
    F  = ( pU -> F
         | g2 -> N2 )
    P0 = ( s.p0 -> N0
         | s.pU -> F  )
    P1 = ( s.p1 -> N1 )
    P2 = ( s.p2 -> N2 )
    G0 = ( s.g0 -> N1 )
    G1 = ( s.g1 -> N2 )
    G2 = ( s.g2 -> N0
         | s.gU -> E  )
end
```
FIG. 11C
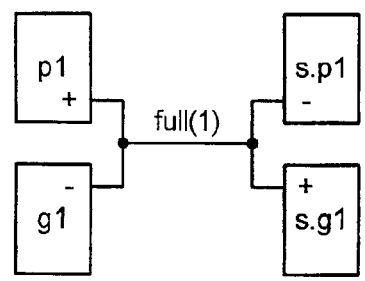
FIG. 11D

```
state E where
    E  = ( p0a  -> N1
         | gU   -> E )
    N0 = ( p0b  -> if full(1) then P1
                   else N1 fi
         | g2b  -> if full(1) then N2
                   else G1 fi )
    N1 = ( p1   -> if full(2) then P2
                   else N2 fi
         | g0   -> if full(2) then N0
                   else G2 fi )
    N2 = ( p2   -> if full(0) then P0
                   else N0 fi
         | g1   -> if full(0) then N1
                   else G0 fi )
    F  = ( pU   -> F
         | g2a  -> N2 )
    P0 = ( s.p0a -> N0
         | s.p0b -> N0
         | s.pU  -> F  )
    P1 = ( s.p1  -> N1 )
    P2 = ( s.p2  -> N2 )
    G0 = ( s.g0  -> N1 )
    G1 = ( s.g1  -> N2 )
    G2 = ( s.g2a -> N0
         | s.g2b -> N0
         | s.gU  -> E  )
end
```

```
stack3 =
state E where
    E  = ( p0a  -> N1
         | gU   -> E  )
    N1 = ( p1   -> N2
         | g0   -> E  )
    N2 = ( p2   -> F
         | g1   -> N1 )
    F  = ( pU   -> F
         | g2a  -> N2 )
    U  = ( p0b  | g2b )
end
```

METHOD AND APPARATUS FOR EFFICIENTLY IMPLEMENTING A LAST-IN FIRST-OUT BUFFER

BACKGROUND

1. Field of the Invention

The present invention relates to electrical circuitry for storing data. More specifically, the present invention relates to a method and an apparatus for efficiently implementing a last-in first-out buffer for storing data items.

2. Related Art

Stacks are one of the most commonly used data structures in computer systems. Only random access memories (RAMs), and possibly FIFOs (first-in-first out buffers), are more frequently used.

A stack receives a data item during a "put" operation. During a "get" operation, the stack returns the data item that was most recently inserted into the stack. A stack data structure operates analogously to a stack of plates, in which the last plate entered onto the top of the stack is the first plate to be retrieved from the stack. Hence, stacks are also referred to as last-in first-out (LIFO) buffers.

A stack can be implemented using a RAM with a top-of-stack pointer. Because of the high integration densities of RAMs, such an implementation consumes very little area per data item. However, an input to a random access memory must drive a large number of lines, which creates at large load. This a disadvantage because driving the large load can increase cycle time and can consume a significant amount of energy.

A stack can also be implemented as a linear array of cells in which put operations cause items in the linear array to shift one direction, and get operations cause items in the linear array to shift in the other direction. Such an implementation may have a small cycle time, because communications are local, concurrent, and involve only small loads. A potential disadvantage of such an implementation is that the total energy consumption per put or get operation can still be quite high, because each put or get operation may cause all items in the array to move. Hence, a linear array-based implementation of the stack is not energy efficient. A second disadvantage is that the area for a linear-array implementation is likely larger than that of a RAM-based design.

What is needed is a method and an apparatus for implementing a stack without the above-described problems of a RAM-based implementation or a linear array-based implementation.

SUMMARY

One embodiment of the present invention provides a system that implements a last-in first-out buffer. The system includes a plurality of cells arranged in a linear array to form the last-in first-out buffer, wherein a given cell in the interior of the linear array is configured to receive get and put calls from a preceding cell in the linear array, and to make get and put calls to a subsequent cell in the linear array. If the given cell contains no data items, the given cell is configured to make a get call to retrieve a data item from the subsequent cell. In this way the data item becomes available in the given cell to immediately satisfy a subsequent get call to the given cell from the preceding cell without having to wait for the data item to propagate to the given cell from subsequent cells in the linear array. If the given cell contains no space for additional data items, the given cell is configured to make a put call to transfer a data item to the subsequent cell. In this way, space becomes available in the given cell to immediately satisfy a subsequent put call to the given cell from the preceding cell without having to wait for data in the given cell to propagate to subsequent cells in the linear array.

In a variation on this embodiment, communications between the plurality of cells take place asynchronously without reference to a system clock signal.

In a variation on this embodiment, the given cell includes a master location for storing a data item. It also includes a slave location for temporarily storing a new data item during a put operation to the given cell until a preexisting data item in the master location can be moved to the subsequent cell to make room for the new data item.

In a variation on this embodiment, the given cell includes a first location and a second location for storing data items.

In a variation on this embodiment, the given cell includes a first location, a second location and a third location for storing data items.

In a variation on this embodiment, the given cell includes more than three locations for storing data items.

In a variation on this embodiment, each cell in the linear array includes circuitry to determine if all subsequent cells in the linear array are completely full.

In a variation on this embodiment, each cell in the linear array includes circuitry to determine if all subsequent cells in the linear array are empty.

BRIEF DESCRIPTION OF THE FIGURES

FIG. 1A illustrates events for a three-place stack in accordance with an embodiment of the present invention.

FIG. 1B illustrates a graph of pass gates for a three-place stack in accordance with an embodiment of the present invention.

FIG. 1C illustrates a specification for a three-place stack in accordance with an embodiment of the present invention.

FIG. 1D illustrates an implementation of a three-place stack in accordance with an embodiment of the present invention.

FIG. 3A illustrates a cell with data movements within a linear array of one-place cells in accordance with an embodiment of the present invention.

FIG. 3B illustrates pass gates for a cell within a linear array of one-place cells in accordance with an embodiment of the present invention.

FIG. 3C illustrates a specification for a cell within a linear array of one-place cells in accordance with an embodiment of the present invention.

FIG. 3D illustrates a specification in normal form for a cell within a linear array of one-place cells in accordance with an embodiment of the present invention.

FIG. 3E illustrates an implementation of a cell within a linear array of one-place cells in accordance with an embodiment of the present invention.

FIG. 5A illustrates a cell with data movements within an array of two-place cells in accordance with an embodiment of the present invention.

FIG. 5B illustrates pass gates for a cell within a linear array of two-place cells in accordance with an embodiment of the present invention.

FIG. 5C illustrates a specification for a cell within an array of two-place cells in accordance with an embodiment of the present invention.

FIG. 5D illustrates a specification in normal form for a cell within an array of two-place cells in accordance with an embodiment of the present invention.

FIG. 5E illustrates an implementation of a cell within an array of two-place cells in accordance with an embodiment of the present invention.

FIG. 7A illustrates events for a two-place cell with full-empty detection in accordance with an embodiment of the present invention.

FIG. 7B illustrates pass gates for a two-place cell with full-empty detection in accordance with an embodiment of the present invention.

FIG. 7C illustrates a specification for a two-place cell with full-empty detection in accordance with an embodiment of the present invention.

FIG. 11A illustrates events for a three-place cell with full-empty detection in accordance with an embodiment of the present invention.

FIG. 11B illustrates pass gates for a three-place cell with full-empty detection in accordance with an embodiment of the present invention.

FIG. 11C illustrates a specification for a three-place cell with full-empty detection in accordance with an embodiment of the present invention.

FIG. 11D illustrates an implementation of a fullness status circuit for a three-place cell with full-empty detection in accordance with an embodiment of the present invention.

DETAILED DESCRIPTION

Figure 2:
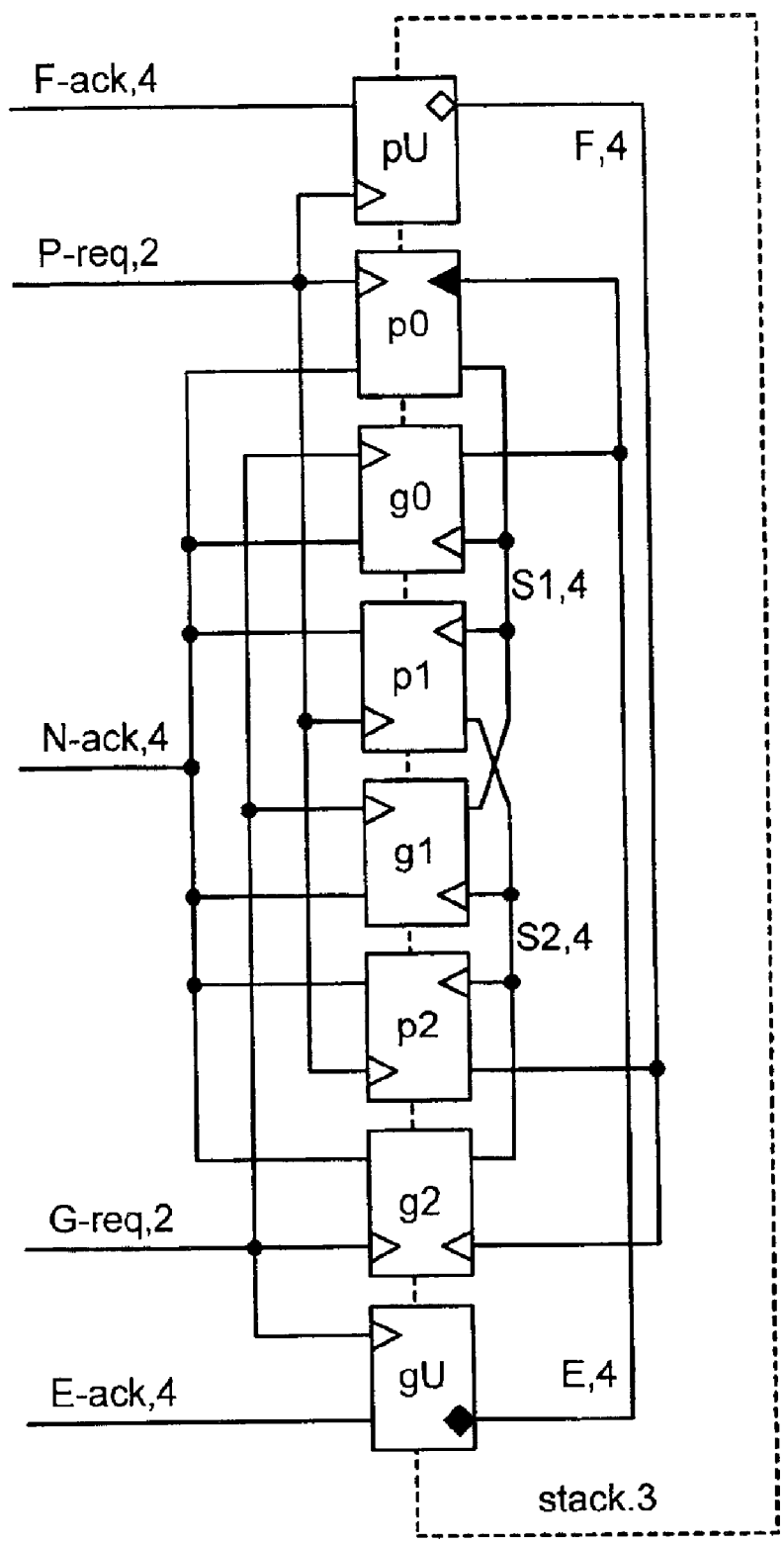
FIG. 2 illustrates a three-place pointer stack with environment connections in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The following discussion describes stack implementations in terms of asynchronous GasP circuitry. A notation for GasP circuitry is described in the last section of this specification with reference to FIGS. 15–19. Note that although implementations of the present invention are described in the context of asynchronous GasP modules, the present invention is not meant to be limited to such modules or to asynchronous implementations.

An N-Place Pointer Stack

One design for an N-place stack is a pointer stack comprised of a single cell that can store N data items and has a top-of-stack pointer. All storage locations are accessible by the environment, and the top-of-stack pointer points to the location where the next item must be put. A get action gets the item from the location just preceding the top-of-the-stack pointer.

In order to prevent overflow and underflow of the stack, the stack has full-empty detection. There are several ways to include full-empty detection in a stack. We have chosen the simplest and most efficient method to detect whether the stack is full, empty, or neither. In the communication behavior between stack and environment, the environment repeatedly requests either a put or a get action and the stack determines whether an action will be successful or not. In case the stack is full, put actions will be unsuccessful. In case the stack is empty, get actions will be unsuccessful. Otherwise, put or get actions will be successful. We denote an unsuccessful put action by pU and an unsuccessful get action by gU. The notation p.i denotes a successful put action of an item into location i, and g.i denotes a successful get action of an item from location i, where $0<i<N$.

Here is a specification of an N-place stack in terms of a finite state machine. An N-place stack has N storage locations: 0, 1, ..., and N−1. When the stack is in state S.i, the stack contains i items and the top-of-the-stack pointer points to location i. Initially, the stack is in state S.0.

state S.0 where $S.0 = (p.0 \to S.1 | gU \to S.0)$
$S.i = (p.i \to S.(i+1)$
  $| g.(i-1) \to S.(i-1))$ for $0 < i < N$
$S.N = (pU \to S.N$
  $| g.N \to S.(N-1))$
end FIG. 1A illustrates communication actions that can take place between environment and a three-place stack. Each of these events, except pU and gU, involves a move of a data item. FIG. 1B illustrates the connections of the pass gates in the data path that correspond to moves of data items. In the figures we assume that a pass gate has a small keeper at its input and amplifies the input signal when it is transparent.

FIG. 1C contains the specification of a three-place stack. We have used the notation E instead of S0 to denote the "empty" state and F instead of S3 to denote the "full" state. The connection of modules inside or overlapping the dashed box in FIG. 1D gives the implementation of the three-place stack with GasP modules. This implementation is a direct mapping of the normal-form specification of FIG. 1C.

In FIGS. 1A–1D we have assigned to each state a delay of four units. Thus, the data bundling condition and the cycle condition for GasP modules are obviously satisfied. The data bundling condition requires that any two successive events, where the first event moves data into a storage location and the second event uses that same data, must have a minimum time separation of four units. The cycle condition requires that each cycle of at least two distinct events must have a minimum delay of six units.

In FIG. 2 we have included connections to the environment and a possible delay assignment for these connections. When the environment wants to perform a put or get action, it sets connection P-req or G-req, respectively. In response to a put or get action, the stack sets connection F-ack, N-ack, or E-ack. The stack acknowledges a put action by setting F-ack when the stack is full. In this case, the put action is unsuccessful. The stack acknowledges a put or get action by setting N-ack when the stack is not full or not empty respectively. In this case, both the put and the get actions are successful. The stack acknowledges by setting E-ack when the stack is empty. In this case, the get action is unsuccessful.

Notice that the cycle time of this design is at least six units, where the cycle time is defined as the time between a put or a get action and the next put or get action.

Let us analyze the design with respect to cycle time, energy consumption, and area. The cycle time is expressed in units of delay, where we assume that each gate has the same delay. If the delay assignments of FIG. 1D can be realized, then the minimum cycle time of this implementation is six units of delay, which is as good as any GasP implementation can do. The area is expressed as the number of pass gates per storable bit. With this definition this design has an area of two. The energy consumption is expressed as the total number of moves in the implementation per put or get action by the environment. Because there is only one move for each put or get action, the energy consumption for this implementation is one.

There is one problem with this implementation, however. The fan-outs in the data part and the control part grow proportional to N. This means that the loads that must be driven increase in proportion to N. Our measures fail to account for these increasing loads. As a result, the gate delay unit fails to be constant; instead the gate delay unit increases for increasing N. Furthermore, although the number of moves remains the same as N increases, the actual energy consumed per move increases with N. These properties limit the size of this N-place pointer stack.

A Linear Array of One-Place Cells

Unlike the N-place pointer stack, where the environment has direct access to all storage locations in the stack, the environment of a linear array of cells has direct access to the storage locations of only the first cell. When successive put actions occur on this stack implementation, items are pushed down further into the linear array. When successive get actions occur, items are pulled up from the linear array. As a result more data movements take place than in the previous design, where an item moves only when the environment wants to put or get that particular item. In the linear array of one-place cells, each data item in each cell moves with every put or get action of the environment. All data movements, however, involve smaller loads than in the N-place pointer stack and many of them can be concurrent.

In order to simplify our first design of this type, we have omitted the full-empty detection and we assume that each cell stores exactly one data item in a quiescent state. FIG. 3A illustrates all events for the first cell in the array. Each cell consists of a master location and a slave location. Initially, and in each quiescent state, the master location contains an item. When the environment puts an item into the stack, the cell stores the item temporarily in the slave until the item in the master has been put in the substack. Then the item in the slave moves to the master.

No temporary storage is necessary for a get action. When the environment requests a get action, the cell moves the item from the master to the environment and then gets an item from the substack. Thus, the only moves are moves from environment to slave, from slave to master, from master to substack, from master to environment, and from substack to master. All these moves can be implemented with the pass gates illustrated in FIG. 3B.

FIG. 3C shows the specification of the cell. FIG. 3D shows the specification in normal form. From the specification in normal form we obtained the implementation shown in FIG. 3E.

FIG. 3E also specifies the delay assignment. We derived this delay assignment as follows. The data bundling condition requires that state N be assigned a delay of four units, because move s.g or x of a data item into the master can be followed by a move g of the same data item out of the master. All other states can be assigned a delay of two units. With this delay assignment the cycle condition is also satisfied, because the cycle

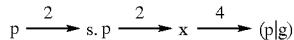

lasts eight units of the delay, and the cycle

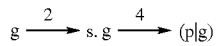

lasts six units of delay, where we have labeled each ordering of events with its minimum delay. Thus, the average cycle time of this implementation is between six and eight units of delay.

Figure 4A:
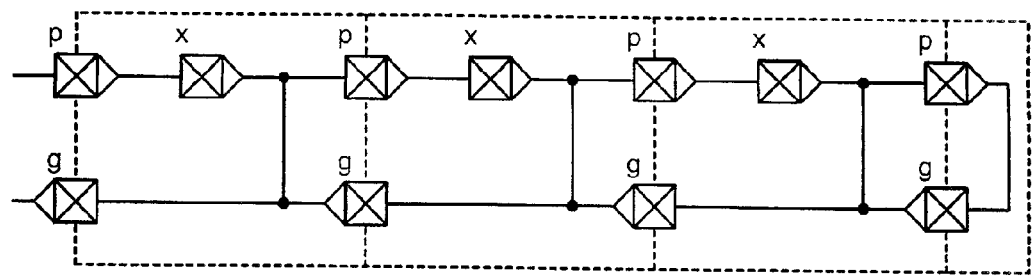
FIG. 4A illustrates a data part of an implementation of a four-place stack using four one-place cells in accordance with an embodiment of the present invention.
Figure 4B:
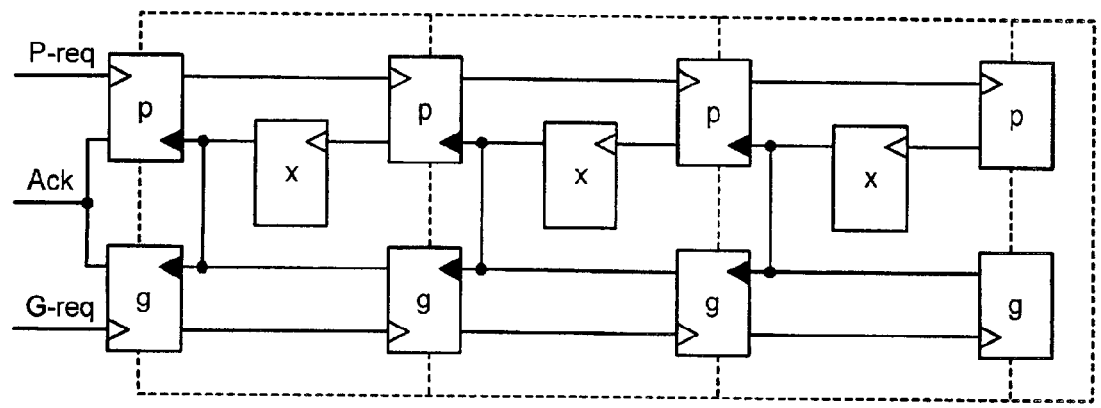
FIG. 4B illustrates a control part of an implementation of a four-place stack using four one-place cells in accordance with an embodiment of the present invention.

FIG. 4A shows a complete data path of a four-place stack implemented as a linear array of four one-place cells. FIG. 4B shows the complete control path.

The last cell in this implementation is different from the other cells in that it has no right neighbor. Its communication behavior can be specified as follows, Last=($(p|g)$→Last).

In other words, the last cell accepts any sequence of puts and gets, and it imposes no constraints whatsoever on the communication actions of its neighbor. For this reason, we can implement this specification with no connections at all, as shown in FIG. 4B. Because there is no overflow or underflow protection, each put action on the last cell overwrites the data item in the last cell with the new data item, and the old data item is permanently lost. Each get action on the last cell copies the current data item to the preceding cell.

Let us briefly look at how this stack implementation compares with the previous implementation. First, we already concluded that the average cycle time of this implementation is between six and eight units. Second, this implementation uses three pass gates for every bit that can be stored. As such, this implementation is less area-efficient than our first implementation. Third, the energy consumption of this implementation, as measured by the total number of moves per put or get action of the environment, is poor.

Notice that every put action by the environment ripples down the complete array to the last cell. For an N-place stack, each put action of the environment involves 2N−1 moves. Each get action also ripples down the complete array to the last cell and involves N moves.

A Linear Array of Two-Place Cells

Our next implementation of a stack is a linear array of two-place cells instead of one-place cells as illustrated in FIGS. 5A–5E. The environment of this stack implementation has access to the two storage locations of the first cell, either of which can contain the item at the top of the stack. The other location is empty. The main contribution of this implementation is the clever use of the two storage locations in each cell, which avoids putting items in temporary storage and thereby reduces the cycle time. Like the previous implementation, this implementation omits a full-empty detection.

Each two-place cell has two storage locations, denoted location 0 and location 1. Items can be moved into and out of both locations in several ways as illustrated in FIG. 5A. The put action p0 denotes a move of an item from the environment into location 0. The get action g0 denotes a move of an item from location 0 to the environment. The put action s.p0 denotes a move of an item from location 0 of the cell to location 0 of the first cell in the substack. The get action s.g0 denotes a move from location 0 of the first cell of the substack to location 0 of the cell. We use similar notations for moves into and out of location 1 of the cell. FIG. 5B shows all the pass gates for implementing the moves into and out of the cell.

The ordering of moves for each cell is such that the cell tries to maintain the following invariant: each cell contains exactly one item. For this reason we distinguish two states: N0 and N1. In state N0, location 1 contains an item and any next item must be put into location 0. In state N1, location 0 contains an item and any next item must be put in location 1. Initially, the first cell starts in state N0, the second cell in state N1, the third cell in state N0, and so on, alternating between state N0 and N1.

The specification of a cell appears in FIG. 5C. In state N0, the environment can put an item in location 0 or get an item from location 1. If the environment puts an item in location 0, the cell subsequently puts the item from location 1 into the substack and returns to state N1. If the environment gets an item from location 1, the cell subsequently gets an item from the substack, puts it in location 0, and returns to state N1. In state N1, the ordering of moves is similar, except that 0's and 1's are interchanged.

FIG. 5D shows the specification in normal form. The implementation of FIG. 5E is a direct translation from the specification in normal form.

FIG. 5E also specifies the delay assignment to the states. The delay assignment must satisfy the data bundling condition and the cycle condition. There are only two orderings of events that involve the data bundling condition, viz.

s.g0→g0 and s.g1→g1.

In both orderings, a move of an item into a location is immediately followed by a move of the same item out of that location. The states between these two moves are N0 and N1, respectively. The data bundling condition requires that we assign a delay of at least four units to these states. If we assign a delay of two units to all other states, then the cycle condition is also satisfied. Notice that each cycle of events therefore has a minimum delay of six units.

Figure 6A:
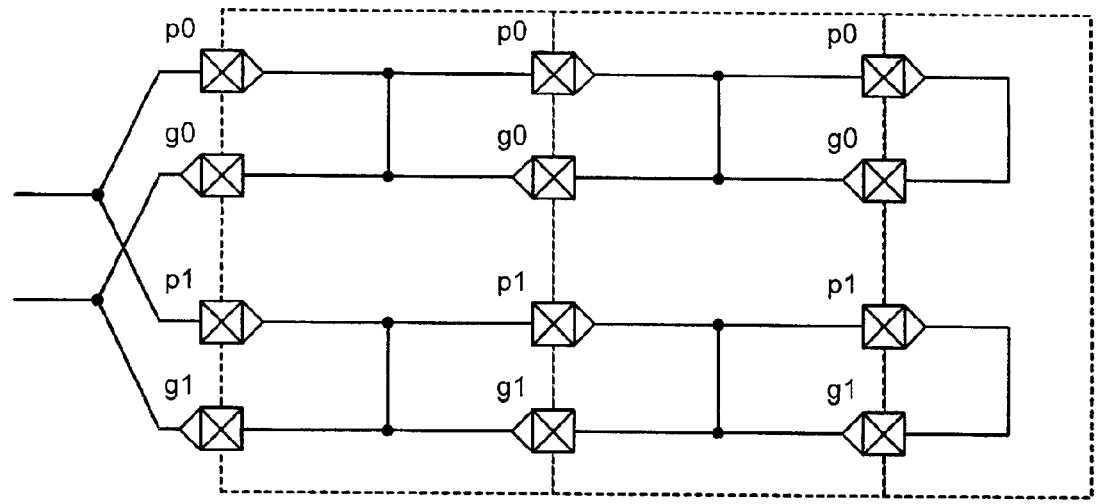
FIG. 6A illustrates a data part of an implementation of a three-place stack using two-place cells in accordance with an embodiment of the present invention.
Figure 6B:
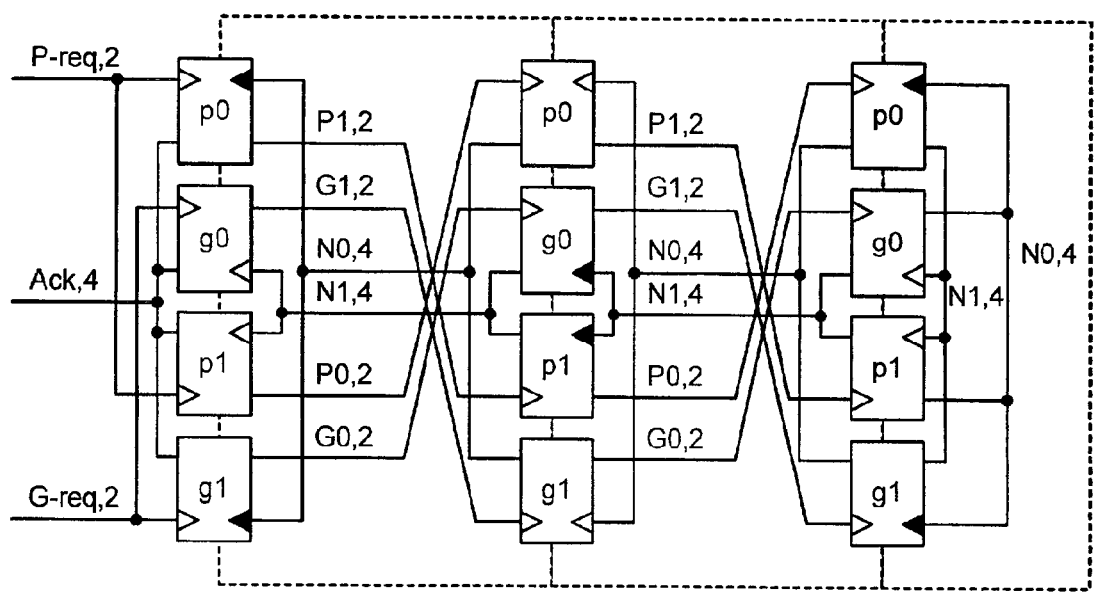
FIG. 6B illustrates a control part of an implementation of a three-place stack using two-place cells in accordance with an embodiment of the present invention.

FIG. 6A contains the complete data path for a three-place stack implemented by three two-place cells. FIG. 6B contains the complete control path for the three-place stack.

The last cell in this implementation has only four communication actions: p0, g0, p1, and g1. Here is its specification.
LastCell=

>state N0 where
>
>>$N0 = (p0 \rightarrow N1$
>>$| g1 \rightarrow N1$
>>$N1 = (p1 \rightarrow N0$
>>$| g0 \rightarrow N0)$
>
>end Because this specification lacks overflow and underflow protection, data items in the last cell can be overwritten or copied multiple times. The last dashed box in FIG. 6B shows the implementation of the last cell, directly translated from its specification.

Let us see how this implementation compares to the previous ones in terms of cycle time, energy consumption, and area. First, this implementation has a minimum cycle time of only six delay units. Furthermore, the loads that must be driven in each move are independent of N. Thus, the units of delay remain bounded for any value of N. Consequently, the minimum cycle time of six units for any value of N is clearly an improvement over the previous implementations. Second, the energy consumption is still poor. Each put or get action from the environment causes N moves in the array, albeit these moves involve small loads. Third, the storage efficiency for this implementation is also poor. This implementation uses four pass gates for each bit stored, because each cell stores exactly one data item.

Two-Place Cells with Full-Empty Detection

The next implementation includes full-empty detection, through which we can double the area efficiency without increasing the cycle time. All cells are still two-place cells. FIGS. 7–10 illustrate this implementation.

Because of the addition of full-empty detection, each cell has a few more events, viz., the unsuccessful put and get actions for the stack, pU and gU, and for the substack, s.pU and s.gU. All events relevant to the cell appear in FIG. 7A. The data path for each cell, shown in FIG. 7B is the same as for the implementation without full-empty detection. FIG. 7C shows the specification of a cell. In addition to states N0 and N1, we consider the states E and F. State E denotes the state in which the cell is empty, and state F denotes the state in which the cell is full. In state N0, location 0 is empty and location 1 contains an item. In state N1, location 1 is empty and location 0 contains an item. Initially, both locations are empty and the cell is in state E. In each state E, N1, N0, and F, the environment can attempt a put or a get action. In the empty state E, the environment can put an item in location 0, denoted by p0, after which the cell enters state N1. Each get action by the environment in the empty state is unsuccessful and returns the cell to the empty state.

In state N1, the environment can put an item in location 1, after which the cell attempts to put the item from location 0 into the substack. If the put action on the substack is successful, the cell returns to state N0. If the put action is unsuccessful, the cell enters the full state F, because the cell now contains two items.

In state N1, the environment can get the item from location 0, after which the cell attempts to get an item from the substack and store it in location 1. If the get action on the substack is successful, the cell enters state N0. If the get action is unsuccessful, the cell goes to the empty state E, because the cell now contains no items.

In state N0, the environment can put an item in location 0, after which the cell puts the item from location 1 into location 1 of the substack and enters state N1. Notice that put actions involving location 1 of the substack are always successful. In fact, if put actions involving location 1 of the substack are always successful, then put actions by the environment on location 1 of the first cell of the stack are always successful. In other word, this property is an invariant of the stack implementation.

If the environment gets the item from location 1, the cell gets an item from location 0 of the substack, stores it in location 0 of the cell, and enters state N1. Notice that get actions involving location 0 of the substack are always successful. In fact, if get actions involving location 0 of the substack are always successful, then get actions by the environment on location 0 of the first cell of the stack are always successful. In other words, this property is also an invariant of the stack implementation.

In state F, each put action by the environment is unsuccessful and the cell remains in state F. A get action by the environment on location 1 brings the cell back to state N1. This completes the explanation of the specification for the cell.

Figures 8A, 8B:
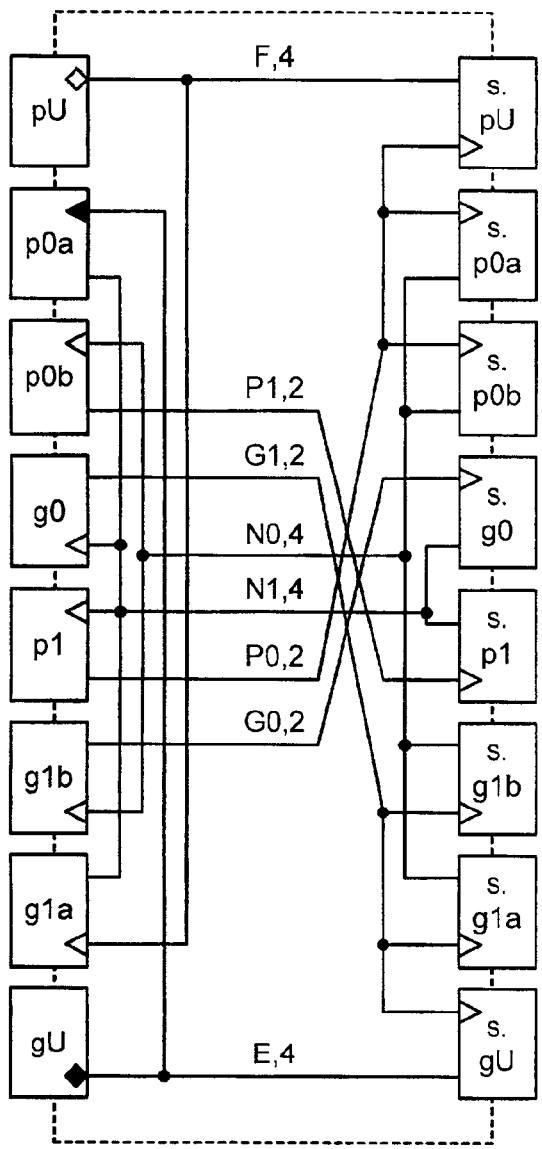
FIG. 8A illustrates an implementation for a two-place cell with full-empty detection in accordance with an embodiment of the present invention.
FIG. 8B illustrates a specification for a two-place cell with full-empty detection in accordance with an embodiment of the present invention.

FIG. 8B gives the specification for the cell in normal form. Notice that there are two occurrences of p0 and g1 in the specification of FIG. 8B. In order to make each symbol unique, we introduced the symbols p0a, p0b, g1a, and g1b for the communications with the environment and symbols s.p0a, s.p0b, s.g1a, and s.g1b for the communications with the substack. Mapping the normal-form specification directly to an implementation yields FIG. 8A.

The delay assignment in FIG. 8A follows almost directly from the two conditions on delay assignments. Because of the data bundling condition, states N0 and N1 must be assigned a minimum delay of four units. Notice that the sequences $$s.g1a \rightarrow g1a,\ s.g1b \rightarrow g1b\ \text{and}\ s.g0 \rightarrow g0$$

move a data item into and immediately out of the same location and have N0 or N1 as intermediate state. These sequences are the only ones with this property. Consequently, if we assign a delay of two units to all other states, then this delay assignment satisfies the data bundling condition. It turns out to satisfy the cycle condition as well.

Instead of assigning a delay of two units to states E and F, however, we assigned a delay of four units to these states. This assignment does not increase the minimum cycle time of six units and is easier to remember. Notice that, with this delay assignment, there is a two-unit delay from a firing of any GasP module on the left in FIG. 8A to a firing of a GasP module on the right, while there is a four-unit delay from a firing of any GasP module on the right to a firing of a GasP module on the left.

Figures 9A, 9B:
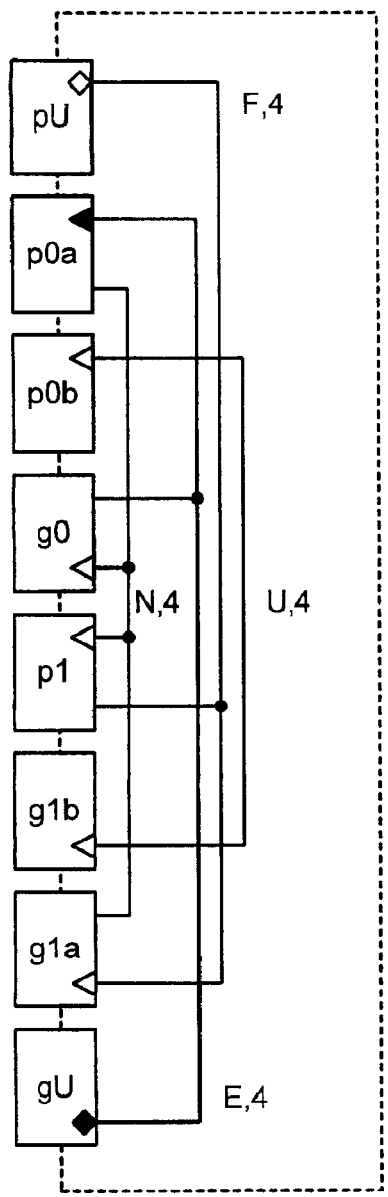
FIG. 9A illustrates an implementation of a last two-place cell in a linear array in accordance with an embodiment of the present invention.
FIG. 9B illustrates a specification of a last two-place cell in a linear array in accordance with an embodiment of the present invention.

The last cell in the linear array of cells is special, because this cell cannot communicate with a substack. The last cell has the same events as the other cells, except for the events prefixed with s. The specification of the last cell appears in FIG. 9B. The last cell has only three reachable states: E, N, and F. In the empty state E, the cell contains zero items; in state N, the cell contains one item; and in the full state F, the cell contains two items. FIG. 9B lists all state transitions for the last cell. In this case, we have chosen to implement each put action on storage location 0 with event p0a and each get action on storage location 1 with event g1a. We could also have chosen events p0b and g1b, respectively. We cannot, however, list both events for the put action or both events for the get action, because only one put action and only one get action may occur. Notice that the events p0b and g1b are listed in the unreachable state U, indicating that these events can never occur. If we had omitted the unreachable state and events p0b and g1b from the specification, an incorrect stack implementation would result, because then these events would be free to occur at any time.

The specification for the last cell is in normal form. The implementation in FIG. 9A is a direct translation of this specification. We have assigned a delay of four units to each state, thereby satisfying the data bundling and the cycle condition.

Figure 10:
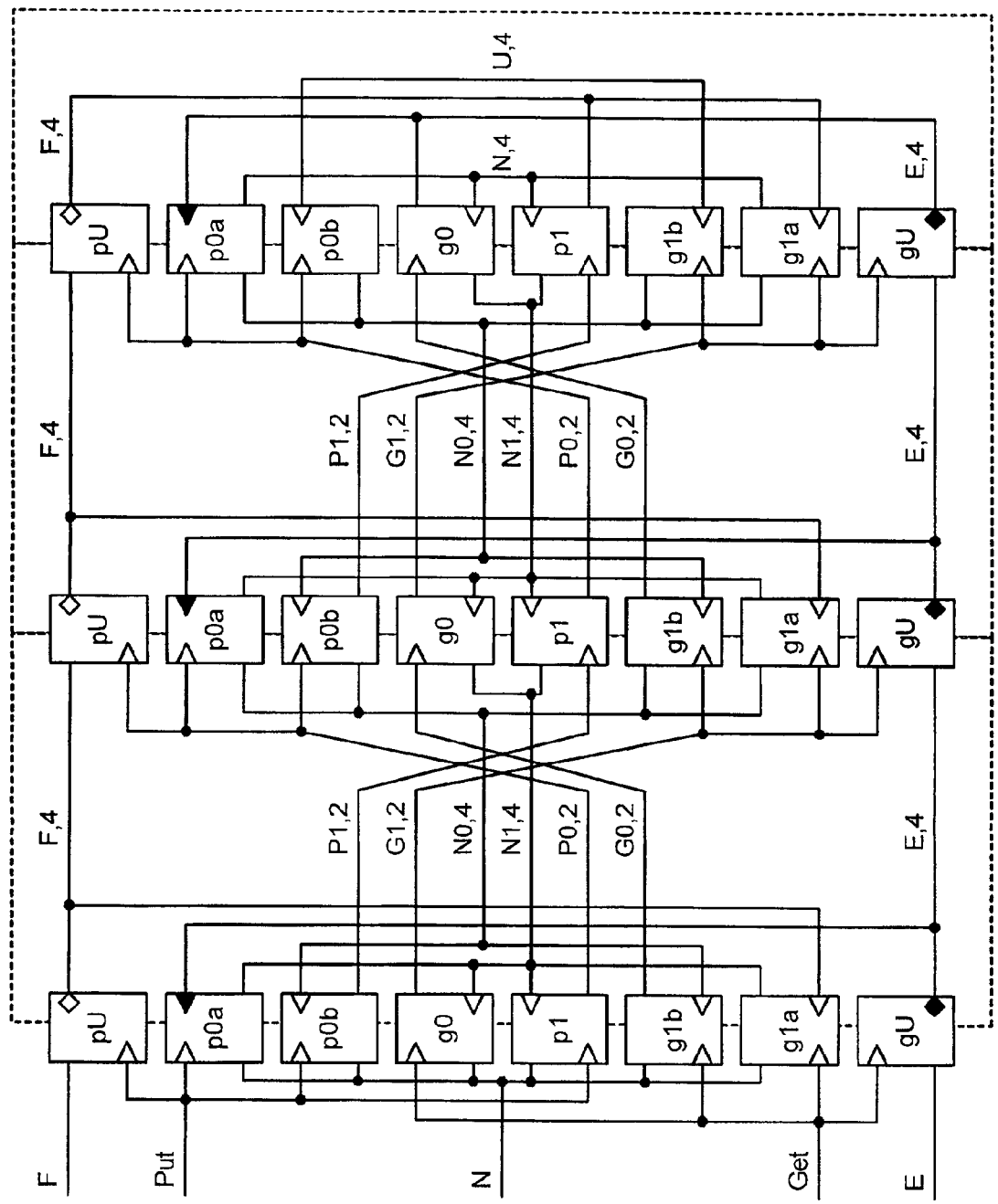
FIG. 10 illustrates a control path of a six-place stack built from a linear array of three two-place cells with full-empty detection in accordance with an embodiment of the present invention.

FIG. 10 shows a complete control part of a six-place stack built from a linear array of three two-place cells. The data part of this implementation is the same as in FIG. 6A. Notice modules p0a and p0b control the same pass gate labeled p0 and modules g1a and g1b control the same pass gate labeled g1.

Here is the quantitative analysis of this implementation. The area for this implementation is better than the area for the previous implementation. The previous implementation consumed four pass gates per storable bit, whereas this implementation consumes only two pass gates per storable bit. The cycle time remains six units of delay. The energy consumption, expressed as the total number of moves per put or get by the environment, is still poor. There are scenarios where each put or get action by the environment causes m moves in the array, where m is the number of items stored in the array. For example, such a scenario occurs when each cell contains one item and the environment keeps alternating between a put and a get. Thus, the worst-case energy consumption is still proportional to the number of items in the stack.

A Linear Array of Three-Place Cells

The main contribution of our final implementation is a reduction in energy consumption brought about by two ideas: first, have at least three storage locations in each cell where puts and gets rotate through the storage locations, and, second, move an item into or out of the substack only when necessary. Besides these two ideas, the implementation illustrates a simple technique for recording the fullness of a single storage location.

FIG. 11A shows all events of a three-place cell. The meanings of the events are similar to the meanings in the previous implementations. As before, pU and gU represent unsuccessful put and get actions respectively. All other events represent moves of items into or out of a storage location in the cell. FIG. 11B illustrates the connections between the pass gates that implement the moves. These two figures are straightforward generalizations of FIGS. 7A and 7B.

FIG. 11C gives the specification for the cell. This specification stipulates that puts and gets rotate through the storage locations and that the cell moves items to or from the substack only when necessary. For example, when in state Ni the environment puts an item in storage location i of the cell, the cell makes sure that storage location i+1 is empty for a potential next put action from the environment, where i+1 is calculated modulo 3. If storage location i+1 is full, then the cell puts the item from that location into the substack and enters state N(i+1). If the storage location i+1 is empty, then the cell immediately enters state N(i+1). When in state Ni the environment gets an item from storage location i−1, the cell makes sure that storage location i−2 is full for a potential next get action from the environment, where i−2 is calculated modulo 3. If storage location i−2 is empty, then the cell gets an item for that location from the substack and enters state N(i−1). If storage location i−2 is full, then the cell immediately enters state N(i−1). All other states have a similar behavior as in the previous implementation.

Like the previous implementation, this implementation maintains the invariant that the only potentially unsuccessful put actions are put actions on storage location 0 of the first cell of the stack, while the only potentially unsuccessful get actions are get actions on storage location 2 of the first cell of the stack. When the cell performs an unsuccessful put action with the substack, in state P0, then the cell itself becomes full and enters the full state F. When the cell has an unsuccessful get action with the substack, in state G2, then the cell itself becomes empty and enters the empty state E.

One problem with this specification is in recording that a storage location is full or empty. We could introduce an extra bit in the data path of each storage location for this purpose. There is a simpler solution, however, which may have wider application. FIG. 11D shows a solution to this problem for storage location 1. A wire connected to an output of four GasP modules records the state of storage location 1. Actions p1 and s.g1 set the state of storage location 1 to "full,'" and actions g1 and s.g1 reset the state of location 1 to "empty." Not shown in the figure is the keeper that should keep the value on the wire. The value of this status wire becomes the data input of a conditional GasP module. For example, the wire representing the status of full (1) conditions the data input of modules p0 and g2. This solution for recording the full-empty status of storage location 1 requires only one keeper and four transistors, hidden in the GasP modules.

When we apply the solution of FIG. 1D to storage location 0, we need one keeper and six transistors, because storage location 0 involves six GasP modules.

There are two reasons why the solution of FIG. 11D is better than adding an extra data bit in the data path. The first reason is that this implementation uses only four or six transistors and one keeper per storage location. The second reason is that the delay constraints for the conditional GasP module are easier to satisfy with this solution, because there is little delay between the put or get action and the change of the full-empty status bit.

Figures 12A, 12B:
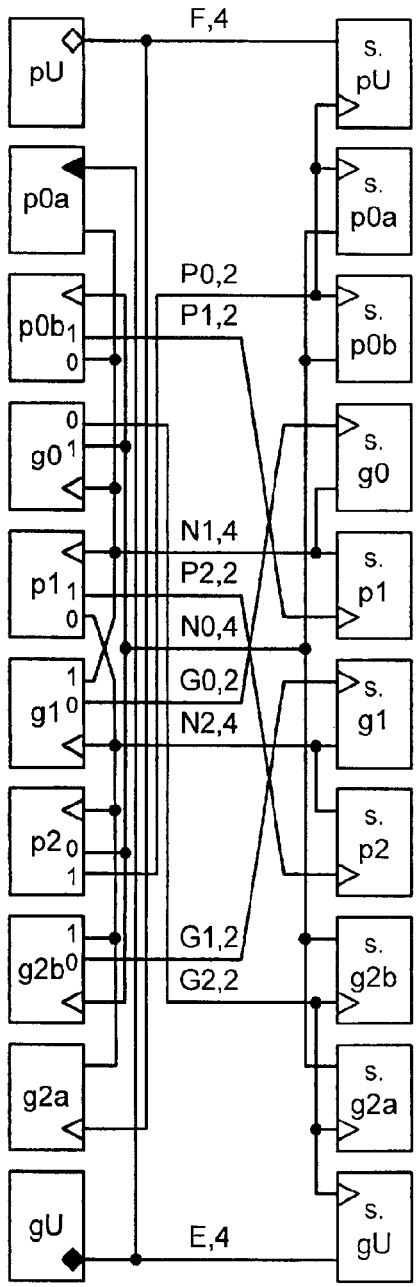
FIG. 12A illustrates an implementation for a three-place cell with full-empty detection in accordance with an embodiment of the present invention.
FIG. 12B illustrates a specification for a three-place cell with full-empty detection in accordance with an embodiment of the present invention.

FIG. 12B shows the normal form for the specification of a three-place cell. Notice that p0 and g2 occur twice in our first specification in FIG. 11C. In order to distinguish the two occurrences of these symbols, we have renamed them in the normal-form specification to p0a and p0b for p0 and to g2a and g2b for g2. FIG. 12A is a direct mapping from the normal-form specification to a connection of GasP modules. In order not to clutter the picture, we have not drawn the circuits that record the fullness status of each storage location, nor have we drawn the data inputs for the conditional GasP modules.

As in the previous implementation, we have assigned a delay of four units to each of the states N0, N1, and N2. Notice that the cell can enter each of these states by a move of an item into a location, and that the cell can leave each such state by a move of the same item out of that location. The data bundling condition requires that such states must be assigned a delay of four units.

All other states satisfy the data bundling condition and may be assigned a delay of two units. This assignment then also satisfies the cycle condition. Without increasing the cycle time, we have assigned a delay of four units to states E and F instead of two units. With this assignment, there is a two-unit delay from the firing of any module on the left in FIG. 12A to a firing of a module on the right, while there is a four—unit delay from the firing of any module on the right to a firing of a module on the left. The delay between two firings of different modules on the left also is four units. The minimum cycle time is six units of delay.

The last cell in the linear array of three-place cells is basically a three-place pointer stack. The specification of the last cell, however, must include actions p0a, p0b, g2a, and g2b. The specification of the last cell appears in FIG. 13B. This specification is similar to the specification of the three-place stack in FIG. 1C. The only differences are some renamings and the presence of the unreachable state u and the unreachable state actions p0b and g2b. In this example, we have chosen to implement each put action on storage location 0 with event p0a and each get action on storage location 2 with event g2a.

The unreachable state with actions p0b and g2b must be present in the specification to prevent the actions p0b and g2b from occurring. An alternative specification for the last cell might interchange actions p0b and g2b with actions p0a and g2a, respectively.

Figures 13A, 13B:
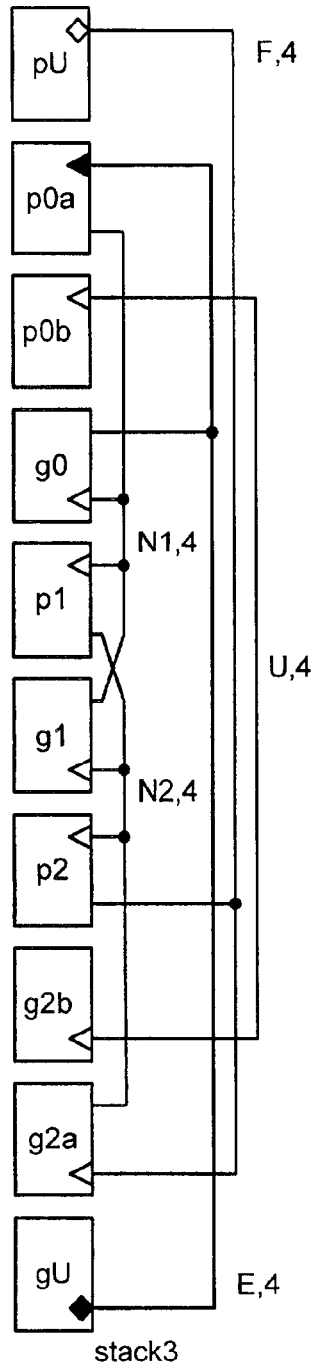
FIG. 13A illustrates an implementation of a last three-place cell in a linear array in accordance with an embodiment of the present invention.
FIG. 13B illustrates a specification of a last three-place cell in a linear array in accordance with an embodiment of the present invention.

The specification for the last cell in FIG. 13B is in normal form. Therefore, we can map this specification into the GasP implementation of FIG. 13A. As in the previous implementations, we have assigned a delay of four units to each state.

Figure 14:
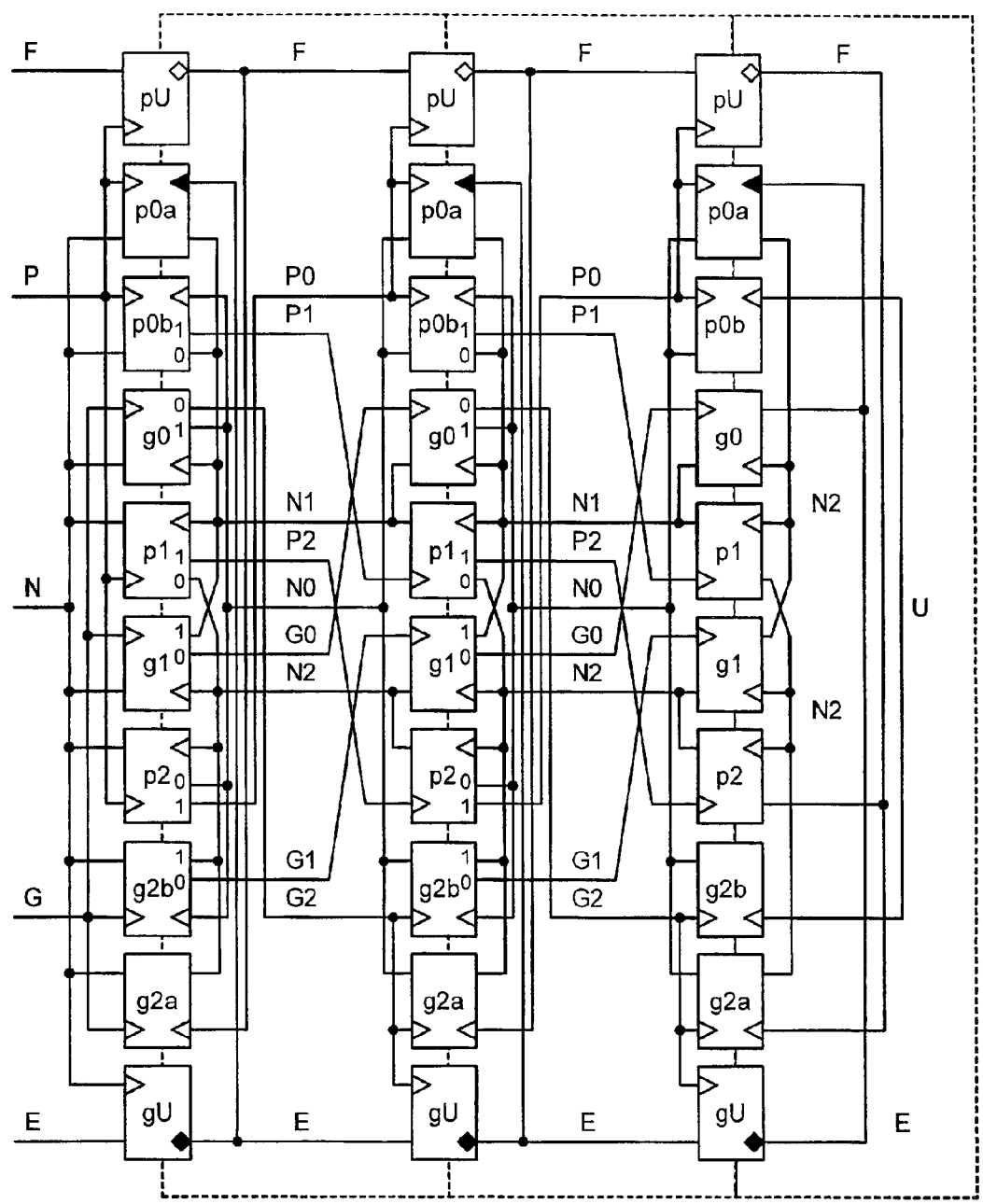
FIG. 14 illustrates a control path of a nine-place stack built from a linear array of three three-place cells with full-empty detection in accordance with an embodiment of the present invention.

Finally, FIG. 14 shows a complete implementation of the control path of a nine-place stack using a linear array of three three-place cells. A quantitative analysis of this implementation gives the following numbers. The cycle time is six units, the best we can do in 2–4 GasP implementations. The data path employs only two pass gates per bit stored, which is the least we have been able to obtain so far. The energy consumption has also improved. The main reason is that put and get actions can annihilate each other while they propagate down the linear array of cells. Notice that every put action succeeding a get action and every get action succeeding a put action propagates only to one cell and do not result in actions on the substack. The same annihilation takes place for put and get actions performed on the substack. The amount of annihilation for the complete implementation depends on the sequences of put and get actions that are performed on the stack. Furthermore, the chance of annihilation increases with n, when using n-place cells where n>3.

Asynchronous GasP Circuitry: Notation for Specifications

In order to specify a parallel composition of finite state machines, we introduce a small program notation. This program notation specifies all sequences of allowable events for a finite state machine. Examples of events are data movements from one location to another, data-dependent decisions, or synchronizations between finite state machines. In its most basic form, a finite state machine is specified by a list of state transitions with an initial state. Here is an example.

$$\text{state } S0 \text{ where} \tag{1}$$

$$S0 = (a \rightarrow S1) \tag{2}$$

$$S1 = (b \rightarrow S0) \tag{3}$$

$$| c \rightarrow S2) \tag{4}$$

$$S2 = (d \rightarrow \text{if } B \text{ then } S0 \tag{5}$$

$$\text{else } S1 \text{ } fi) \tag{6}$$

$$\text{end} \tag{7}$$

This finite state machine has three states S0, S1, and S2. At any time during execution, each finite state machine is in exactly one state. State S0 is the initial state, as specified by line (1). Lines (2) through (6) specify all state transitions. Line (2) stipulates that in state S0 an occurrence of event a leads to state S1. The arrow "→" represents "leads to." In state S1, an occurrence of event b leads to state S0, as specified in line (3), or an occurrence of event c leads to state S2, as specified by line (4). The bar "|" in line (4) represents "or." The choice between event b and event c is made either by the finite state machine itself, in which case the choice is a non-deterministic choice or by the environment of the finite state machine, in which case the choice is a deterministic choice. The environment can determine the choice by selecting either event a or event b. In this discussion we consider only deterministic choices.

Lines (5) and (6) specify a data-dependent choice. Depending on the value of bit B, an occurrence of event d in state S2 leads to state S0, when B=1, or to state S1, when B=0. Names for states are always local and can be reused outside their scope, viz., lines (1) through (7). Names for events always start with a lower-case letter. For the moment we assume that event names are global.

The parallel composition of two finite state machines FSM0 and FSM1 is denoted by

FSM1 & FSM1

The parallel composition of two finite state machines represents all sequences of events that conform to each of the finite state machines. A common event of two machines can occur only when both machines are in a state that permit the common event. On can say that parallel composition is the "behavioral AND" of two finite state machines, hence the notation &. Formally, the parallel composition is defined by a weave of trace structures.

GasP Modules

We denote a GasP module by means of a rectangular box with a label inside and a series of connections. The label denotes the event that is associated with the GasP module. Each GasP module can have three different types of connections. FIGS. 15 and 16 give the three types of connections of a GasP module together with their 2-4 GasP implementations. FIG. 15 shows the symbols and their implementations for connections between GasP modules where the time separation between the "firings" of two modules is two gate delays. FIG. 16 shows the symbols and their implementations for connections between GasP modules where the time separation between the "firings" of two modules is four gate delays. Both figures show connections attached to the left and the right of a GasP module. Apart from a reflection, the implementations of the left-side and right-side connections are the same.

Figure 15A:
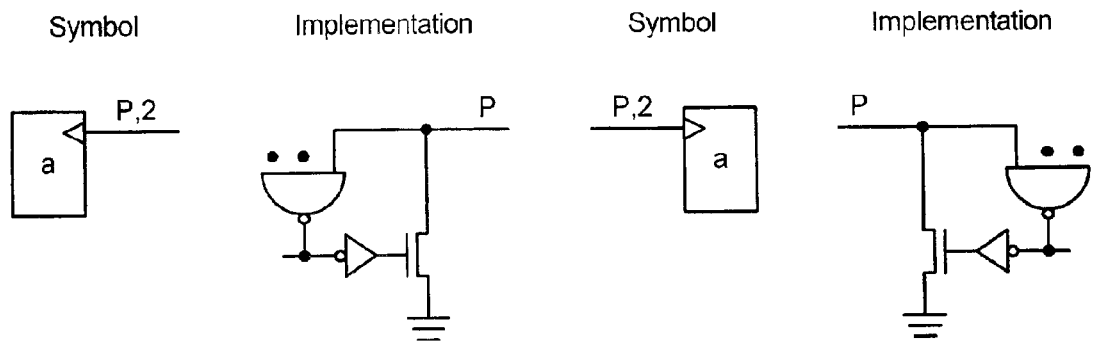
FIG. 15A illustrates a type of terminal connection for a GasP module with a time separation of two gate delays between firings of modules in accordance with an embodiment of the present invention.
Figure 15B:
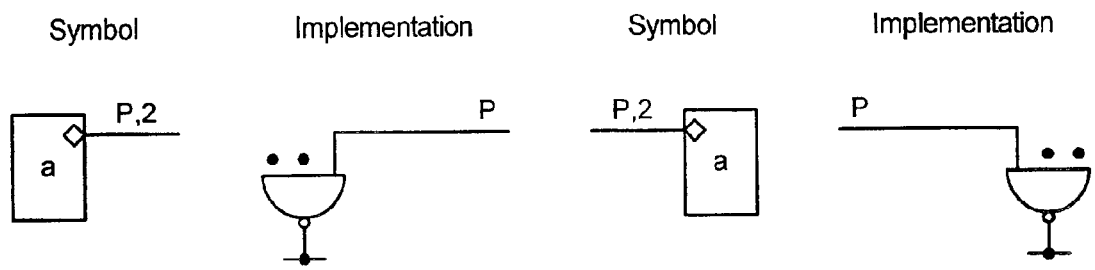
FIG. 15B illustrates another type of terminal connection for a GasP module with a time separation of two gate delays between firings of modules in accordance with an embodiment of the present invention.
Figure 15C:
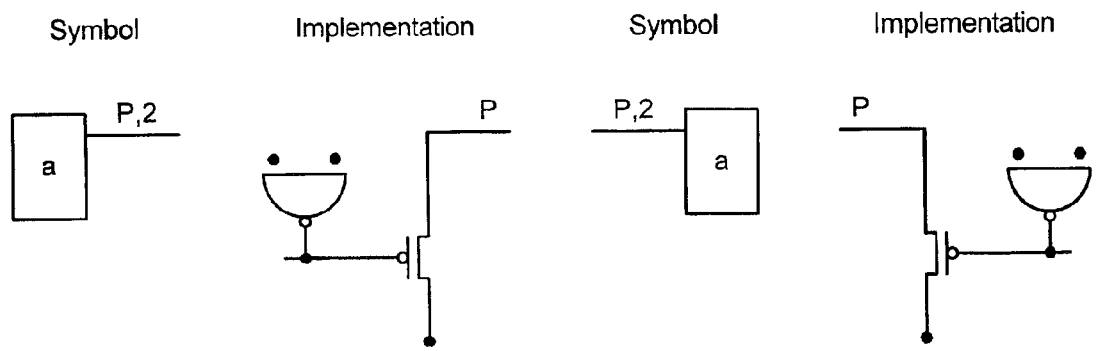
FIG. 15C illustrates yet another type of terminal connection for a GasP module with a time separation of two gate delays between firings of modules in accordance with an embodiment of the present invention.
Figure 16A:
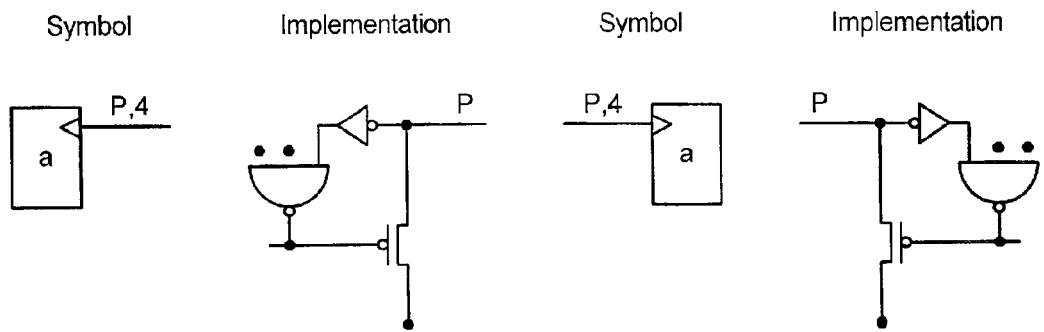
FIG. 16A illustrates a type of terminal connection for a GasP module with a time separation of four gate delays between firings of modules in accordance with an embodiment of the present invention.
Figure 16B:
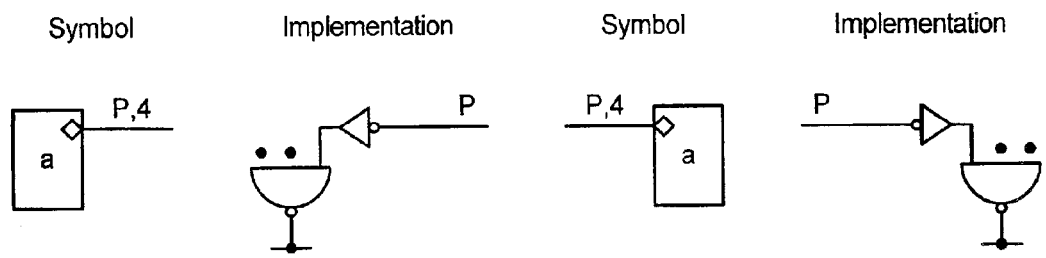
FIG. 16B illustrates another type of terminal connection for a GasP module with a time separation of four gate delays between firings of modules in accordance with an embodiment of the present invention.
Figure 16C:
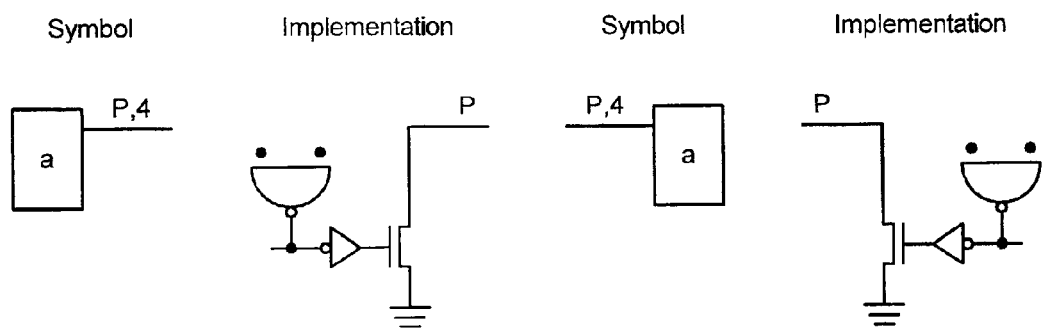
FIG. 16C illustrates yet another type of terminal connection for a GasP module with a time separation of four gate delays between firings of modules in accordance with an embodiment of the present invention.

FIG. 15A shows a GasP module with a so-called self-resetting input. FIG. 15B shows a GasP modules with a so-called non-resetting input. FIG. 15C shows a GasP module with an output. Common in all GasP module implementations is a NAND gate. To complete the GasP Module implementation, circuitry is added to the NAND gate for each connection. When all inputs of a GasP module are set, which means HI in the implementations of FIGS. 15A and 15B, the NAND gate will eventually "fire," i.e., go LO. The firing of the NAND gate defines the occurrence of the event. After the NAND gate fires, a pull-down transistor resets each self-resetting input. The non-resetting input has no reset capability. When the NAND gate fires, the pull-up transistor sets the output.

FIG. 16 illustrates the same ideas as in FIG. 15, except that now "setting" and "resetting" are implemented differently. Here, an input is set when the input is LO. Thus, resetting an input happens by means of a pull-up transistor, and setting an output happens by means of a pull-down transistor.

Each connection is implemented as a tri-state wire with a keeper. A tri-state wire is a wire that is either "driven HI", "driven LO", or "not driven." To avoid clutter, connections in schematics appear as lines between GasP modules, and keepers are not shown. When a connection is driven HI or LO, the connection will be driven for a short period only, a period that is long enough to set the keeper and wire HI or LO. The keeper will then keep the state of the connection when the wire is not driven. Using the GasP implementations of FIGS. 15 and 16, the period that a wire is driven is about three gate delays. Notice that each pull-down or pull-up transistor conducts for a period of about three gate delays.

In order for these implementations to work properly, all transistors must be properly sized. Here, this means that all gates must have the same step-up ratio, i.e., the ratio between each gate's drive strength and output load is the same. When properly sized, each gate has about the same delay, and thus we can justifiably speak about units of delay between any two events.

Figure 17A:
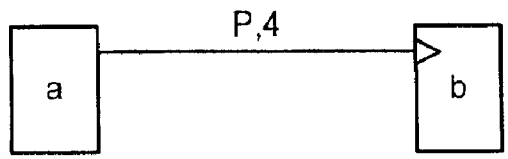
FIG. 17A is a symbolic representation of a connection between GasP modules with a delay of four units between two events in accordance with an embodiment of the present invention.
Figure 17B:
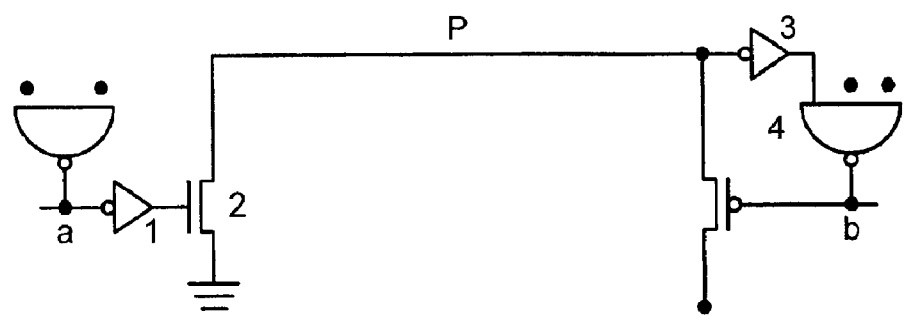
FIG. 17B illustrates corresponding circuitry for a connection between GasP modules with a delay of four units between two events in accordance with an embodiment of the present invention.
Figure 17C:
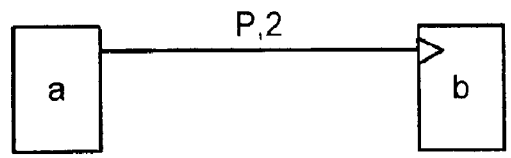
FIG. 17C is a symbolic representation of a connection between GasP modules with a delay of two units between two events in accordance with an embodiment of the present invention.
Figure 17D:
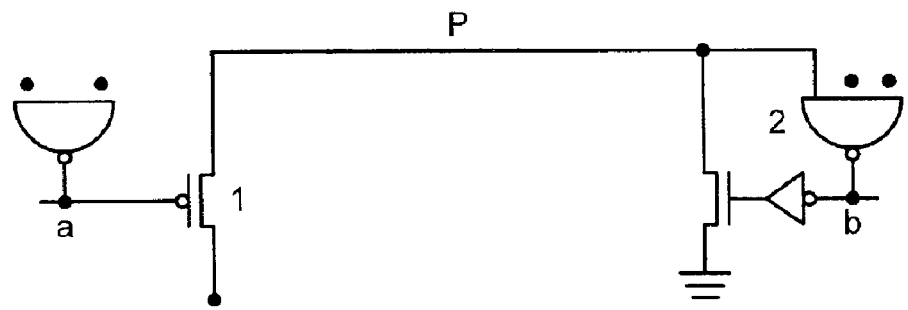
FIG. 17D illustrates corresponding circuitry for a connection between GasP modules with a delay of two units between two events in accordance with an embodiment of the present invention.

The label P on the connections to the GasP modules in FIGS. 15 and 16 gives a name to the connections and is often associated with the name of the state to which the connection corresponds. The labels 2 and 4 indicate whether the implementation of the connection must realize a time separation of two or four gate delays, respectively, between firings of successive GasP modules. FIG. 17 illustrates this idea. FIG. 17A shows a simple connection between GasP modules and FIG. 17B shows its implementation. The label 4 indicates that the connection must realize time separation of four gate delays between the firings of modules a and b. Notice that between node a going LO and node b going LO in FIG. 17B there are four gate delays. Similar remarks can be made for FIGS. 17C and 17D, where the label 2 denotes a time separation of two gate delays. The labels 2 and 4 will come in handy later when we want to calculate cycle times in GasP networks.

Figure 18A:
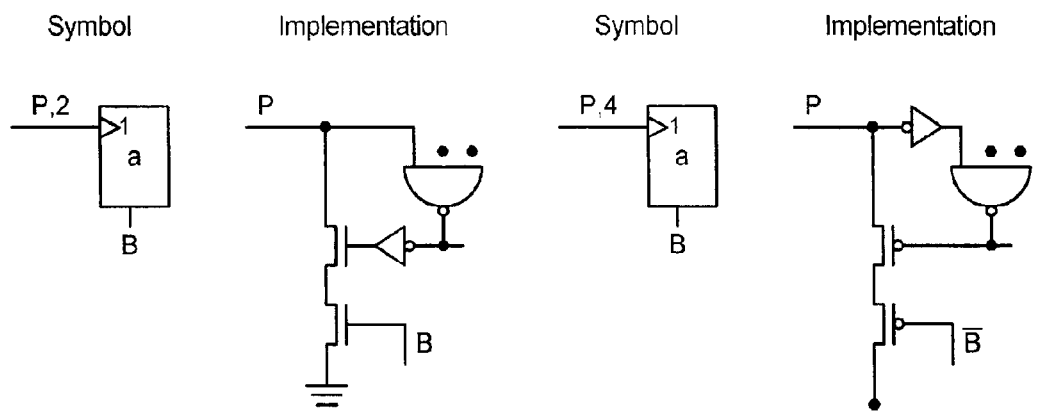
FIG. 18A illustrates conditional self-resetting inputs in accordance with an embodiment of the present invention.
Figure 18B:
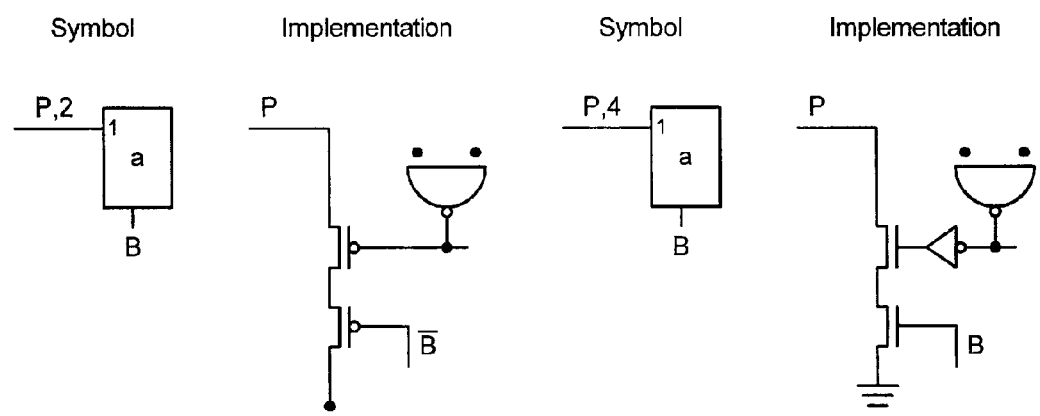
FIG. 18B illustrates conditional outputs in accordance with an embodiment of the present invention.

FIG. 18 shows the GasP modules that are used for data-dependent decisions. The general rule for these GasP modules is that a GasP module sets an output or resets an input if and only if the value of bit B corresponds to the label attached to that output or input respectively. In FIG. 18A resetting the self-resetting inputs is conditional on the value of bit B. Label 1 near the self-resetting input denotes that the input resets if and only if the value of B is 1. In FIG. 18B, setting the output is conditional on the value of B. For a data-dependent choice where the label 1 is replaced by 0, interchange B and $\overline{B}$ in the implementations.

In order to implement a data-dependent decision properly, there are two delay constraints that must be satisfied: bit B must be valid when event a can occur and bit B must remain valid for the duration of the pulse at the output of the NAND gate.

In an implementation we indicate the initial state of each connection by darkening the arrowheads or diamonds inside the modules that are associated with the connection. A connection with a darkened arrowhead or diamond is initially set, that is, the connection is initialized HI when the connection has the label 2 and initialized LO when the connection has the label 4.

Figure 19A:
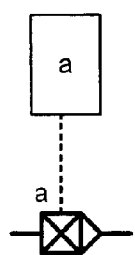
FIG. 19A illustrates symbols representing an event as a data move in accordance with an embodiment of the present invention.
Figure 19B:
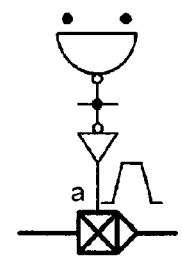
FIG. 19B illustrates an implementation of an event as a data move in accordance with an embodiment of the present invention.

Events often represent data movements in the data path. FIGS. 19A and 19B illustrate symbols we use in a data path and how data moves can be implemented. Suppose that event a represents a data move. FIG. 19A illustrates the GasP module for event a, where the input and output connections for the GasP module are not shown. The data path, which may be multiple bits wide, appears below the GasP module in bold. The five-corner polygon with the cross represents a normally-opaque latch.

Although there are many implementations for a normally-opaque data latch, they are all based on the same principle: a brief pulse at the control input of the latch realizes a data move from the storage location at the left of the latch to the storage location at the right of the latch. For our implementation we assume that the latch consists of a series of keepers, normally-opaque pass gates, and drivers, one for each bit in the data path. The drivers drive the wires at the right of the five-corner polygon, and the keepers are at the input of the latch to avoid any fighting outputs when data paths merge.

The latch has a label a to indicate that event a represents a data move across this latch. The dashed line between the GasP module and the latch symbolizes that each firing of GasP module a must implement a data move across latch a. We often show the control and data path of a circuit separately, where the labels at the latches in the data path indicate which GasP modules control the latches. FIG. 19B illustrates how a GasP module realizes the data move. When GasP module a fires, a falling pulse starts at the output of the NAND gate with a width of about three gate delays. As a result, the output of the inverter in FIG. 19B creates a rising pulse of about the same width at the control input of the latch. This pulse makes the latch briefly transparent, thereby passing a new data value to the next storage location.

If events with different names must implement the same data move, the inverter in FIG. 19B can be replaced by a NAND gate with multiple inputs, one for each GasP module that must implement that data move. For each latch, at any time at most one GasP module may cause a pulse at the latch. Thus, the NAND gate performs an OR function for falling pulses.

There is a straightforward translation from a specification of a finite state machine into a network of GasP modules, provided the specification is in normal form. A specification is in normal form if and only if for each state transition in the specification there is just a single event leading one state to the next state and every event in the specification has a unique name. The translation of a normal-form specification into a network of GasP modules maps every event to a GasP module and maps every state to a wire connection among GasP modules. Each wire connection among GasP modules representing a state is an input to every GasP module whose event leads the finite state machine out of that state, and the wire connection is an output of every GasP module whose event leads the finite state machine into that state.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus that implements a last-in first-out buffer, comprising:

a plurality of cells arranged in a linear array to form the last-in first-out buffer;

wherein each cell in the linear array operates asynchronously with respect to other non-neighboring cell in the linear array;

wherein a given cell in the interior of the linear array is configured to asynchronously coordinate operations with only a preceding cell in the linear array and a subsequent cell in the linear array without relying on external controls and, more specifically, is configured to receive get and put calls from the preceding cell in the linear array, and to make get and put calls to the subsequent cell in the linear array;

wherein if the given cell contains no data items, the given cell is configured to make a get call to retrieve a data item from the subsequent cell, whereby the data item becomes available in the given cell to immediately satisfy a subsequent get call to the given cell from the preceding cell without having to wait for the data item to propagate to the given cell from subsequent cells in the linear array;

wherein if the given cell contains no space for additional data items, the given cell is configured to make a put call to transfer a data item to the subsequent cell, whereby space becomes available in the given cell to immediately satisfy a subsequent put call to the given cell from the preceding cell without having to wait for data in the given cell to propagate to subsequent cells in the linear array; and wherein inter-cell communications between the plurality of cells take place asynchronously without reference to a system clock signal.

2. The apparatus of claim 1, wherein the given cell includes:

a master location for storing a data item; and a slave location for temporarily storing a new data item during a put operation to the given cell until a preexisting data item in the master location can be moved to the subsequent cell to make room for the new data item.

3. The apparatus of claim 1, wherein the given cell includes a first location and a second location for storing data items.

4. The apparatus of claim 1, wherein the given cell includes a first location, a second location and a third location for storing data items.

5. The apparatus of claim 1, wherein the given cell includes more than three locations for storing data items.

6. The apparatus of claim 1, wherein each cell in the linear array includes circuitry to determine if all subsequent cells in the linear array are completely full.

7. The apparatus of claim 1, wherein each cell in the linear array includes circuitry to determine if all subsequent cells in the linear array are empty.

8. An apparatus that implements a last-in first-out buffer, comprising:

a plurality of cells arranged in a linear array to form the last-in first-out buffer;

wherein each cell in the linear array operates asynchronously with respect to other non-neighboring cell in the linear array;

wherein a given cell in the interior of the linear array is configured to asynchronously coordinate operations with only a preceding cell in the linear array and a subsequent cell in the linear array without relying on external controls and, more specifically, is configured to receive get and put calls from the preceding cell in the linear array, and to make get and put calls to the subsequent cell in the linear array;

wherein if the given cell contains no data items, the given cell is configured to make a get call to retrieve a data item from the subsequent cell, whereby the data item becomes available in the given cell to immediately satisfy a subsequent get call to the given cell from the preceding cell without having to wait for the data item to propagate to the given cell from subsequent cells in the linear array;

wherein if the given cell contains no space for additional data items, the given cell is configured to make a put call to transfer a data item to the subsequent cell, whereby space becomes available in the given cell to immediately satisfy a subsequent put call to the given cell from the preceding cell without having to wait for data in the given cell to propagate to subsequent cells in the linear array;

wherein communications between the plurality of cells take place asynchronously without reference to a system clock signal;

wherein each cell in the linear array includes circuitry to determine if all subsequent cells in the linear array are completely full;

wherein each cell in the linear array includes circuitry to determine if all subsequent cells in the linear array are empty; and wherein inter-cell communications between the plurality of cells take place asynchronously without reference to a system clock signal.

9. The apparatus of claim 8, wherein the given cell includes:

a master location for storing a data item; and a slave location for temporarily storing a new data item during a put operation to the given cell until a preexisting data item in the master location can be moved to the subsequent cell to make room for the new data item.

10. The apparatus of claim 8, wherein the given cell includes a first location and a second location for storing data items.

11. The apparatus of claim 8, wherein the given cell includes a first location, a second location and a third location for storing data items.

12. The apparatus of claim 8, wherein the given cell includes more than three locations for storing data items.

13. A method for implementing a last-in first-out buffer, wherein the method operates within a plurality of cells arranged in a linear array to form the last-in first-out buffer, wherein each cell in the linear array operates asynchronously with respect to other non-neighboring cells in the linear array, wherein a given cell in the interior of the linear array is configured to asynchronously coordinate operations with only a preceding cell in the linear array and a subsequent cell in the linear array without relying on external controls and, more specifically, is configured to receive get and put calls from the preceding cell in the linear array, and to make get and put calls to the subsequent cell in the linear array, the method comprising:

making a get call from the given cell to retrieve a data item from the subsequent cell if the given cell contains no data items, whereby the data item becomes available in the given cell to immediately satisfy a subsequent get call to the given cell without having to wait for the data item to propagate to the given cell from subsequent cells in the linear array; and making a put call from the given cell to transfer a data item to the subsequent cell if the given cell contains no space for additional data items, whereby space becomes available in the given cell to immediately satisfy a subsequent put call to the given cell without having to wait for data in the given cell to propagate to subsequent cells in the linear array;

wherein inter-cell communications between the plurality of cells take place asynchronously without reference to a system clock signal.

14. The method of claim 13, wherein the given cell includes a master location and a slave location for storing data items; and wherein during a put operation to the given cell involving a new data item, the new data item is temporarily stored in the slave location until a preexisting data item in the master location can be moved to the subsequent cell to make room for the new data item.

15. The method of claim 13, wherein the given cell includes a first location and a second location for storing data items.

16. The method of claim 13, wherein the given cell includes a first location, a second location and a third location for storing data items.

17. The method of claim 13, wherein the given cell includes more than three locations for storing data items.

18. The method of claim 13, further comprising monitoring signals from subsequent cells in the linear array to determine if the subsequent cells are completely full.

19. The method of claim 13, further comprising monitoring signals from subsequent cells in the linear array to determine if all the subsequent cells are empty.

* * * * *